July 29, 1958 A. MACOVSKI 2,845,573

COLOR KINESCOPE BIASING SYSTEM

Filed Sept. 8, 1954

INVENTOR.
Albert Macovski
BY Orin D Mitchell
ATTORNEY

United States Patent Office
2,845,573
Patented July 29, 1958

2,845,573

COLOR KINESCOPE BIASING SYSTEM

Albert Macovski, Massapequa, N. Y., assignor to Radio Corporation of America, a corporation of Delaware Application September 8, 1954, Serial No. 454,764
2 Claims. (Cl. 315—13)

Figures 1, 2:
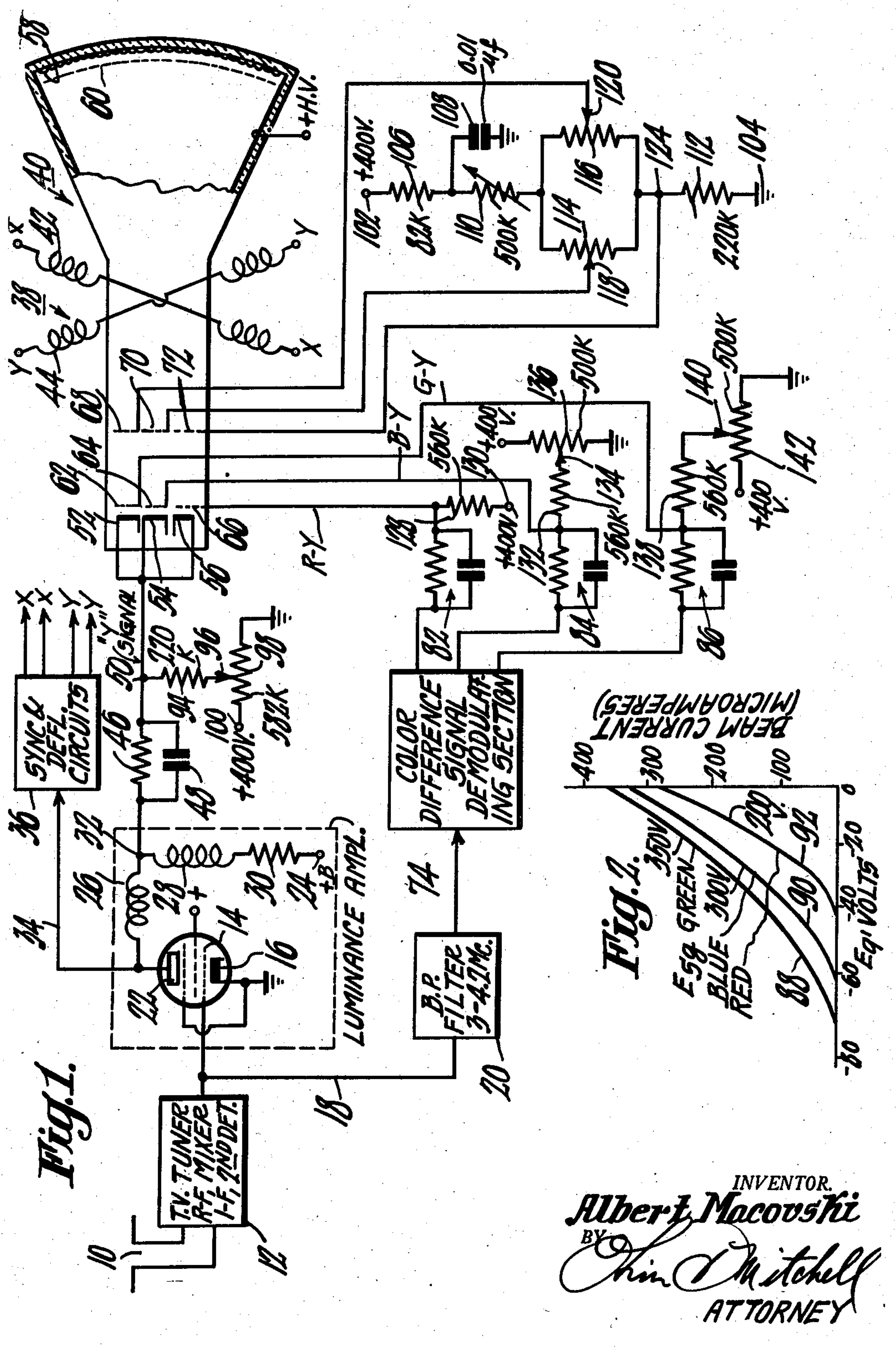

The present invention relates to new and improved color television apparatus and, more particularly, to circuitry associated with the color image reproducing apparatus of a color television receiver.

In the luminescent screens of certain types of multicolor image reproducing devices which are employed in reconstructing images in substantially their natural color from received television signals, materials are utilized which emit light of respectively different selected component colors in response to electron beam impingement. One difficulty encountered in the use of such light producing materials is that presently available phosphors used for producing the different light colors generally do not all have the same efficiency (i. e., light output versus electron energy). That is to say, if several electron beams of equal intensity are caused to excite the different light producing phosphors, the intensity of the light emanating from the different phosphors will not generally be the same. As a result of such different phosphor efficiencies, the video signals representative of the colors in the image being reproduced will not be effective in reproducing a true image upon being translated into light energy.

It has been proposed to overcome the foregoing difficulty in image reproducing systems employing tri-color kinescopes having three electron beams by allotting a higher beam current operating range to that electron beam which is intended to impinge upon the least efficient light producing phosphor material. Such variation in beam current operating range may be effected by applying respectively different voltages to the different grid electrodes which control the several electron beams.

In varying the voltages applied to the grid electrodes of a multi-beam cathode ray tube, the characteristics of the individual electron beams are altered in such a manner that they do not coincide at the level of video signal where no light is intended to be produced (i. e., "black level," corresponding to beam current cutoff). In order to compensate for the lack of coincidence between the black level of the separate electron beams, another group of grid electrodes within the image reproducing tube, each of such electrodes being associated with a separate one of the electron beams, may be held at a different control potential. Stated otherwise, when the screen grid potential of one of several guns of a tri-color kinescope is lowered in order to effect an increased beam current per unit of applied video signal, the beam current cutoff level for that gun is correspondingly changed, thus requiring the application of a new bias potential between the control grid and cathode of that gun for the purpose of bringing the cutoff level of that gun into coincidence with the cutoff levels of the other two guns.

Additionally, in the operation of a color image reproducing kinescope, it is desirable to provide controllable means for setting the absolute brightness or background level of the reproduced image, which level will be understood as being that of the average beam current intensity.

In view of the problems set forth in the foregoing description of the operation of a color image reproducing kinescope, it will be appreciated that the apparatus for applying the operating potentials to the various electrodes thereof must be capable of affording wide latitude.

It is, therefore, a primary object of the present invention to provide new and improved circuitry for controlling the operation of a color image reproducing kinescope of the type employing a separate electron beam for each of the several component colors to be reproduced.

Where a tri-color tube of the three gun variety is operated in such manner that each electron gun thereof is supplied with a video signal representative of a given component color, it is possible to compensate for the relative differences in phosphor efficiency by controlling the amplitudes of the video signals applied to the guns. While such an expedient has proved to be quite effective in use, certain other considerations dictate that, in particular receiver designs, a single source of video signals be employed for controlling all three of the beams of a tri-color kinescope. It is in connection with the latter type of arrangement that the present invention is most advantageous.

In general, the present invention contemplates the provision of means for applying all of the necessary operating potentials to the several beam current controlling electrodes of a multi-gun color kinescope. The invention will be described in accordance with a specific embodiment in which a signal representative of the luminescence component (i. e., monochrome) of a television image is applied to all three cathodes of a tri-color kinescope for controlling the intensity of the electron beams produced thereby as a function of image luminescence and in which color representative signals are applied to the separate control grid electrodes of the kinescope. Assuming that the several selected component colors to be reproduced are, respectively, red, green and blue and, further, that the red light producing phosphor material is the least efficient of the three, means are provided for setting the over-all cutoff values for the guns by setting their screen grid electrode potentials, which means may be termed a master screen grid potential supply.

In view of the assumption regarding the lowest phosphor efficiency being that of the red phosphor, the screen grid electrode of the red gun is connected to a fixed point in a voltage dividing network, which network further includes potentiometer means in series therewith and having a pair of adjustable contacts or taps for connection to the green and blue screen grid electrodes. The master control for the screen grid potentials may take the form, in accordance with the invention, of a variable resistor in series with the potentiometer means and with the fixed point at which the red gun screen grid is connected. As has been described, such manipulation of the screen grid potentials relative to one another results in a lack of coincidence of the cutoff potentials of the several guns. Hence, means are additionally provided for controllably applying differential biases to the control grids of the green and blue electron guns, whereby the potentials applied to those electrodes may be adjusted relative to the potential of the red gun control grid electrode for bringing about effective coincidence of the three black levels. Such coincidence is necessary, as will be understood, for proper gray scale balance. Also, in accordance with the invention, means are provided in the form of a variable bias potential source connected to the several cathodes of the kinescope for setting the cathode potential with respect to a reference, this last-named control being in the nature of a master brightness adjustment.

As will be understood more fully hereinafter, the present invention affords means for providing all of the necessary potentials, and in a controllable manner, for the proper operation of a multi-beam color kinescope. Moreover, the apparatus of the present invention is extremely efficient, in that no redundancy of apparatus is presented therein, despite the fact that a wide variety of adjustment is afforded.

Additional objects and advantages of the present invention will become apparent to those skilled in the art from a study of the following detailed description of the accompanying drawing, in which;

Figure 1 illustrates, by way of a block and schematic diagram, a color television receiver embodying the principles of the present invention; and Figure 2 illustrates certain curves useful in understanding the operation of the invention.

Referring to the drawing, and particularly, to Figure 1 thereof there is shown a color television receiver of well known form such, for example, as that described in an article entitled "Principles of NTSC compatible color television," by Hirsch et al., which appeared in the February 1952 issue of Electronics. While the specific form of signal processing apparatus involved does not per se constitute a part of the invention, it may be noted that the receiver may be adapted to operate upon signals made up in accordance with standards set by the Federal Communications Division on December 17, 1953. In accordance with those standards, information regarding the luminance of a television scene is transmitted by amplitude-modulation of a main carrier wave with video signals proportional to the elemental brightness values of the scene, while the electrical information necessary for the reproduction of several component colors in the scene is transmitted by a phase- and amplitude-modulated subcarrier wave. The instantaneous phase of the subcarrier wave with respect to a reference phase is indicative of a selected hue and the instantaneous amplitude of the wave is proportional to the degree of saturation of the hue. In the interest of considerations not involved herein, the subcarrier wave is conventionally modulated with so-called color difference signals, rather than the video signals representative directly of the component colors.

The antenna 10 in the apparatus of Figure 1 is adapted to intercept the above-described carrier wave information and to apply it to the input terminals of a television tuner section 12 which will be understood as including the usual radio-frequency, mixer, intermediate-frequency and second detector stages. The detected composite signal is applied simultaneously to the control grid electrode 14 of a luminance amplifier 16 and, via a lead 18, to a bandpass filter 20. The anode 22 of the luminance amplifier 16, which is illustrated as being of conventional form, is connected to a source of positive operating potential (+B) at a terminal 24 via series and shunt peaking arrangements 26 and 28, respectively, and a load resistor 30. Thus, there is available at the terminal 32 an amplified version of the luminance component of the composite television signal. The anode 32 of the luminance amplifier 16 is illustrated as being connected via a lead 34 to the synchronizing and scanning deflection circuits 36 whose output terminals X—X and Y—Y are adapted for connection to the correspondingly-designated terminals of a scanning deflection yoke 38 which is associataed in the usual manner with the color image reproducing kinescope 40. The circuits 36 will be understood as furnishing sawtooth deflection currents of television line and field frequencies to the horizontal and vertical deflection windings 42 and 44 comprising the yoke 38.

The luminance amplifier output terminal 32 is direct-current-coupled via an isolating network comprising the parallel combination of a resistor 46 and capacitor 48 to the common junction 50 of the three cathodes 52, 54 and 56 of the tri-color kinescope 40. Although the specific form of the kinescope 40 does not constitute a part of the present invention, it may be noted that it may be of the type described in the article entitled "Three-gun shadow mask color kinescopes," by H. B. Law, which appeared in the October 1951 issue of Proceedings of the IRE. In this case, however, the tri-color kinescope is illustrated at having its multi-color phosphor screen 58 laid down on the generally spherical surface of the face of the kinescope. The aperture mask or shadow mask 60 of the kinescope 40 is also of a generally spherical configuration concentric with the phosphor screen 58. Associated with the cathodes 52, 54 and 56, respectively, are control grids 62, 64 and 66 and screen grids 68, 70 and 72, so that it will be understood that, for example, each of the cathodes forms a part of a separate electron gun which is adapted to produce an electron beam (not shown) intended for impingement upon those phosphor areas of the screen 58 which emit light of a particular component color.

The composite signal provided at the output of the tuner section 12 and passed through the filter 20 constitutes, after such filtering, the so-called chrominance information regarding the television subject. This chrominance information, in the form of the phase- and amplitude-modulated subcarrier is applied via a lead 74 to a block labeled "color difference demodulating section" which will be understood as including a plurality of stages for deriving from the chrominance signals the red, blue and green color difference signals "R–Y," "B–Y" and "G–Y". D.-C. coupling networks 82, 84 and 86 apply the red, blue and green color difference signals, respectively, to the control grids 66, 64 and 62. As described thus far, the apparatus of Fig. 1 is in accordance with conventional color television practice. Suitable circuitry for performing the functions of the various blocks illustrated may be found, for example, in an article entitled "Compatible color television receiver," by K. E. Farr, which appeared in the January 1953 issue of Electronics. Prior to describing the remaining circuitry of the apparatus of Fig. 1 which is provided in accordance with the present invention for controlling the operation of the tri-color kinescope 40, certain operational characteristics of a cathode ray tube should be noted in general.

Referring therefore, to Fig. 2, there is shown a family of curves representative of kinescope operating characteristics wherein beam current is plotted along the ordinate axis and the potential of the control grid (with respect to cathode) is plotted on the abscissa axis. The curves 88, 90 and 92 are indicative of several exemplary screen grid voltages, as shown. The illustrative voltages, it should be borne in mind, are designated in the drawing merely by way of example of typical kinescope operation and in which it is assumed that the red light producing phosphor material is the least efficient of the three, the blue phosphor is the next efficient and the green phosphor is the most efficient. From the curves 88, 90 and 92, it may be seen that different screen grid potentials result in operating characteristics of different slope so that a given video signal amplitude will produce a different amount of beam current for each of the three guns. Specifically, where equal amounts of video signal "drive" are applied to the red, blue and green guns, there will result beam currents wherein red is the maximum, followed by blue and green in that order.

Different screen grid voltage potentials result also in a changed cutoff or "black level" value, so that, as will be recognized from the drawing, the use of different screen grid potentials for compensation for different phosphor efficiencies requires alteration of the control grid bias for the several guns in order that coincidence of the black level values may be had, as necessary for the production of proper gray scale rendition.

Referring again to Fig. 1, it will be seen that the junction point 50 of the three cathodes is connected via a current-limiting resistor 94 to an adjustable slider tap 96 in contact with a potentiometer 98 which is connected between a source of positive potential at the terminal 100 and ground reference potential. The potentiometer 98, therefore, constitutes a master brightness control and sets the absolute potential of the cathodes with respect to ground reference. In keeping with the foregoing description of the operational characteristics of the tri-color kinescope 40 in which it was noted that the effective operating range for each of the electron guns is established by the potential applied to the screen grid, the circuitry provided by the present invention for applying suitable potentials to the screen grids 68, 70 and 72 will now be described.

Basically, the screen grid potential source is supplied from a terminal 102 which is at some established positive potential with respect to ground reference at 104. The network includes specifically a decoupling arrangement comprising the series resistor 106 and bypass capacitor 108, which arrangement serves to filter out alternating components of the voltage. A variable resistor 110 which performs the function of a master screen grid potential-control is also included in the series path between the terminals 102 and 104. A fixed resistor 112 is connected at its lower end to the ground reference point 104 and, at its upper end, to the junction of a pair of parallel potentiometers comprising the resistors 114 and 116 having associated therewith adjustable slider taps 118 and 120, respectively. The red gun screen grid 72 is connected to the upper end 124 of the fixed resistor 112, while the blue and green screen grids 70 and 68 are connected directly to the slider taps 118 and 120. Assuming again that the red light emitting phosphor of the screen 58 is the least efficient, it will be apparent that proper "set up" of the kinescope 40 requires that the screen grid potential of the red gun should be set at the lowest potential of the three screen grids, a fact which is insured by the connection thereof to the terminal 124. Variation of the master screen control resistor 110 will set the screen grid potential of the red gun so that the proper operating range for that gun is selected. Specifically, the optimum potential for the screen grid 72 is that which permits the use of the greatest range of the operating characteristic curve 92 (Fig. 2). The blue and green screen grid potentials may then be set by suitably positioning the taps 118 and 120 on the potentiometer resistors 114 and 116 for the proper gray scale rendition with a given video signal applied to the cathodes 52, 54 and 56. By virtue of the fact that the master screen grid control resistor 110 is in series with the parallel combination of the potentiometer 114 and 116 and with the fixed resistor 112, any variation in the value of the resistor 110 will bring about a change in the screen grid potentials of the several guns. The ratios of the several screen grid potentials will, however, remain unchanged, since any change in current through the resistor 110 is reflected in the same percentages at the three screen grids. Hence, the specific arrangement for providing operating potentials to the screen grids affords a wide latitude of control and in such manner that any one of the screen grid potentials may be varied without affecting the ratio relationship of the others.

With the screen grid voltages suitably adjusted for a uniform gray scale for signals applied to the cathodes of the kinescope, there remains only the problem of setting the voltages of the several control grids with respect to the cathodes in such manner as to bring coincidence of the black levels of the guns. Such setting is accomplished in the novel and effective, yet relatively simple, manner illustrated in Fig. 1. In accordance with the assumption of relative phosphor efficiencies, the control electrode 66 of the red electron gun is connected through a fixed resistor 128 to a source of positive potential at the terminal 130, thereby fixing the potential of the control grid 66 with respect to ground reference. It will be understood, therefore, that the bias of the control grid 66 with respect to the cathode 56 may be set by suitably positioning the slider tap 96 of the master brightness control on the resistor 98. As may be determined from the curves of Fig. 2, the low positive potential of the red screen grid is accompanied by a less negative (i. e., more positive) control grid cutoff bias than that of the other guns. It is, therefore, necessary to establish biases on the control grids 62 and 64 in keeping with the cutoff values established for the green and blue guns by their respective screen grid potentials. The control grid 64 of the blue electron gun is connected through a resistor 132 and a variable slider tap 134 to a point on the potentiometer 136. Similarly, the control grid 62 of the green gun is connected via a resistor 138 and slider tap 140 to a point on the potentiometer 142. The potentiometers 136 and 142 may be termed means for providing the differential control grid biases necessary for bringing about coincidence of the three black level values in the kinescope. The potentiometer 136 will, therefore, be set to such position as to place a somewhat more negative bias on the control grid 64 than that on the grid 66. Similarly, the potentiometer 142 will be adjusted to place a still more negative bias on the control grid 62. The exact settings for the potentiometers 136 and 142 may be determined, in operation, by applying a range of signal voltages to the common cathodes of the kinescope and adjusting the differential bias potentiometers until a uniform gray scale is realized. Since the master brightness control potentiometer 98 varies all three cathodes equally as to potential, the scene will remain neutral over its range.

From the foregoing, it will be recognized that complete control of the operating voltages for a tri-color kinescope may be had in accordance with the circuitry of the present invention and in a manner requiring a minimum number of variable resistive elements or potentiometers. Since all three cathodes are supplied with the same luminance signal, in the operation of the tube as an image reproducer, the master brightness control potentiometer and master screen control resistor serve together to set the operating range for that electron gun functioning to produce red light. The necessary adjustment of the screen grids of the green and blue electron guns for bringing about proportionality of beam current necessary for color balance may be simply effected by varying only the two screen grid potentiometers. Finally, the requisite coincident relationship of black level valves is accomplished by setting of the two controls grid potentiometers.

Having thus described my invention, what I claim as new and desire to secure by Letters Patent is:

1. In a color television receiver of the type having multi-color cathode ray image-reproducing means including a first and second grid electrode for each component color to be reproduced and common cathode means, apparatus comprising: means connecting said common cathode means to a variable bias source for establishing the potential of such common cathode means with respect to a reference; means for connecting the first grid associated with a selected one of such component colors to a point of fixed potential with respect to said reference; variable means for aplying operating potentials to the first grid associated with each of such other component colors in such manner that the respective bias potentials of said latter first grids with respect to such common cathode means may be adjustably established; and means for applying operating potentials to said second electrodes, said means including a series combination, between a point of said reference potential and a source of potential positive with respect thereto, said series combination including a fixed resistor having one end connected to said point of reference potential, a variable resistance, and a plurality of potentiometers in parallel with each other, each having an independently variable contact terminal, said means further including a connection between the second grid associated with said first recited first grid and the end of said fixed resistor remote from said connection to said point of reference potential, and means connecting said other second grids to respective ones of said independently variable potentiometer contact terminals.

2. In a color television receiver of the type having multi-color cathode ray image-reproducing means including cathode means and first and second grid electrodes for each component color to be reproduced, the combination comprising: means for applying operating potentials to said first grid electrodes with respect to said cathode means; and voltage dividing means for applying respective operating potentials to said second grid electrodes, said voltage-dividing means comprising a resistor having one end connected to a point of fixed potential, first and second potentiometers connected in parallel with each other, each of said potentiometers having a variable contact terminal, a source of voltage positive with respect to said fixed potential, a variable resistor, means connecting said parallel potentiometers and said variable resistor in series between said source of voltage and the end of said resistor remote from said point of fixed potential, means connecting a first one of said second grid electrodes to a point on said voltage dividing means electrically located between said point of fixed potential and said potentiometers, and means connecting the others of said second grid electrodes to respective ones of said potentiometer terminals.

References Cited in the file of this patent

Introduction to Color Television, page 36, published by Admiral Corporation, February 1954.